Aug. 4, 1970  J. A. PARANZINO  3,522,656
METHOD AND APPARATUS FOR MEASURING AND MARKING TROUSER
LEGS FOR DETERMINING THE LENGTH THEREOF
Filed Oct. 12, 1967  3 Sheets-Sheet 3

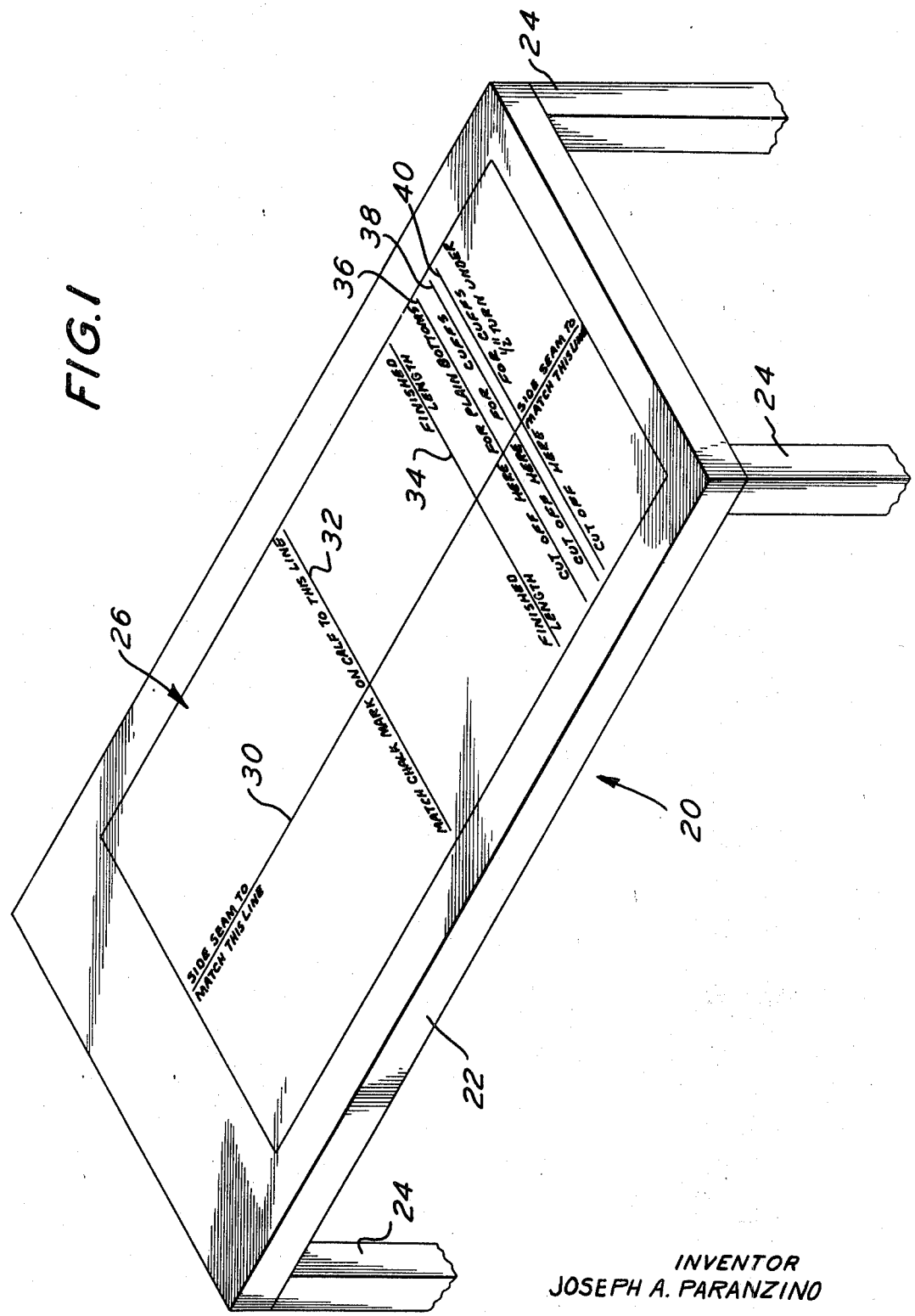

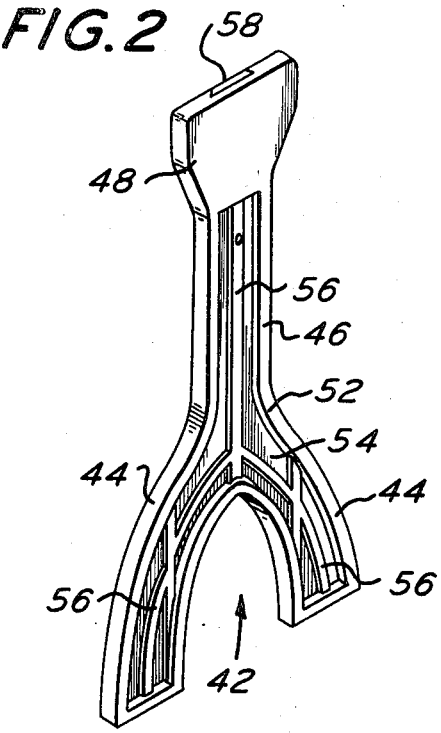
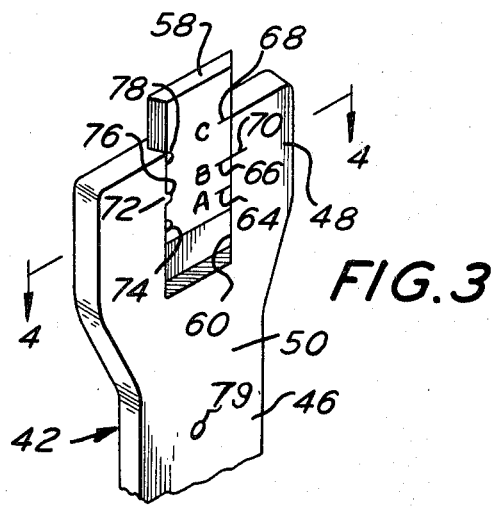
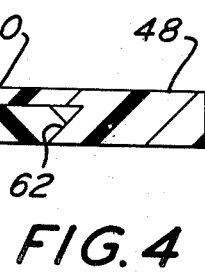
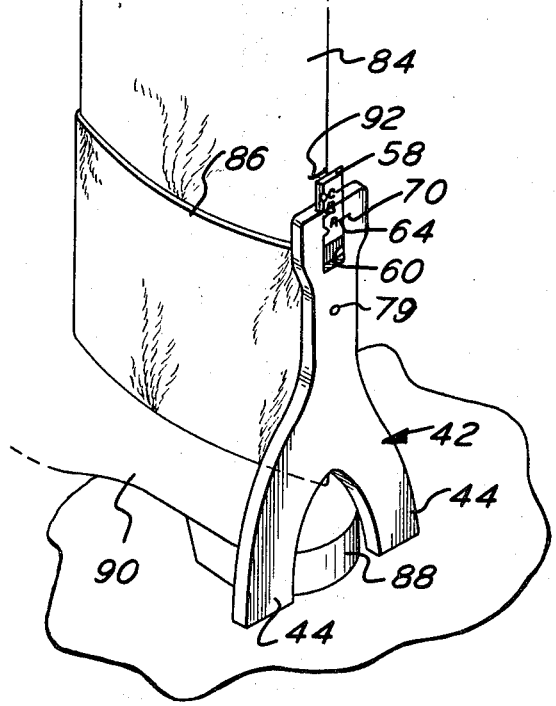

INVENTOR
JOSEPH A. PARANZINO
BY
Caesar, Rivise, Bernstein & Cohen
ATTORNEYS.

United States Patent Office 3,522,656
Patented Aug. 4, 1970

3,522,656
METHOD AND APPARATUS FOR MEASURING AND MARKING TROUSER LEGS FOR DETERMINING THE LENGTH THEREOF
Joseph A. Paranzino, Cherry Hill, N.J., assignor to H. Daroff & Sons, Inc., Philadelphia, Pa., a corporation of Pennsylvania
Filed Oct. 12, 1967, Ser. No. 674,841
Int. Cl. A41h 9/02
U.S. Cl. 33—2                    3 Claims

ABSTRACT OF THE DISCLOSURE

A method and apparatus for measuring and marking men's trousers. The apparatus includes an elongated member for enabling marking of each leg of the trousers a predetermined height above the floor and a layout member. A layout member is provided which includes a longitudinally extending line and a plurality of spaced lines which extend transversely to the longitudinal line. A first one of the lines corresponds to the mark on the legs and a second one of the lines corresponds to the final length of the trousers. The trouser legs are then finished by placing the inseam of each of the legs over the longitudinal line and aligning the marks on the legs with the first line and finishing the trousers at the second line.

---

This invention relates to tailoring devices for men's clothing and in particular to a method and apparatus for measuring and marking men's trousers for the finishing thereof.

Present marking devices and methods used in men's stores for finishing off the length of men's trousers when purchased alone or in combination with a suit often require considerable bending on the part of the salesman or the tailor. Such methods and apparatus are often inaccurate in measuring the proper length for the trousers. Moreover, if the person purchasing the trousers has one leg shorter than the other, unless the tailor himself does the measuring, the trousers will not fit the person accurately if only one leg of the trousers has been measured in advance. Further, even where the tailor has measured and marked the trousers himself, the finishing of the trouser legs is tedious in that proper guides are not available.

It is therefore an object of the invention to overcome the aforementioned disadvantages.

Another object of the invention is to provide a new and improved method and apparatus for measuring and marking men's trousers.

Another object of the invention is to provide a new and improved method for marking men's trousers which is both quick and accurate.

Yet another object of the invention is to provide a new and improved marking device which facilitates marking of unfinished trousers and which may be adjusted for the particular style in which the trousers will be worn.

Another object of the invention is to provide a new and improved measuring apparatus which facilitates laying out of the trousers for the tailor so that the individual legs may be finished quick and accurately.

Another object of the invention is to provide a new and improved method for measuring and marking men's trousers which facilitates finishing the trousers in a selected one of a plurality of styles.

These and other objects of the invention are achieved by providing a method and apparatus for measuring and marking men's trousers. The apparatus includes an elongated member for enabling the marking of each leg of the trousers a predetermined height above the floor and a layout member. The layout member has a longitudinally extending line and a plurality of spaced lines which extend transversely to the longitudinal line. A first of the transverse lines corresponds to the marks on the legs of the trousers and a second of the lines corresponds to the finished length of the trousers. The trouser legs are finished by placing the inseam of each of the legs over the longitudinal line and aligning the marks on the legs with the first line and finishing the trousers at the second line.

Other objects and many of the attendant advantages of this invention will be readily appreciated as the same becomes better understood by reference to the following detailed description when considered in connection with the accompanying drawings wherein:

FIG. 1 is a perspective view of a layout table embodying the invention;

FIG. 2 is a perspective view of an elongated marking member embodying the invention per se;

FIG. 3 is an enlarged fragmentary perspective view of the top front face of the marking member;

FIG. 4 is an enlarged sectional view taken along the line 4—4 of FIG. 3;

FIG. 5 is a fragmentary perspective view of a trouser leg being marked by using the marking member embodying the invention;

Referring now in greater detail to the various figures of the drawing wherein similar reference characters refer to similar parts, a layout table is generally shown at 20 in FIG. 1.

Figure 7:
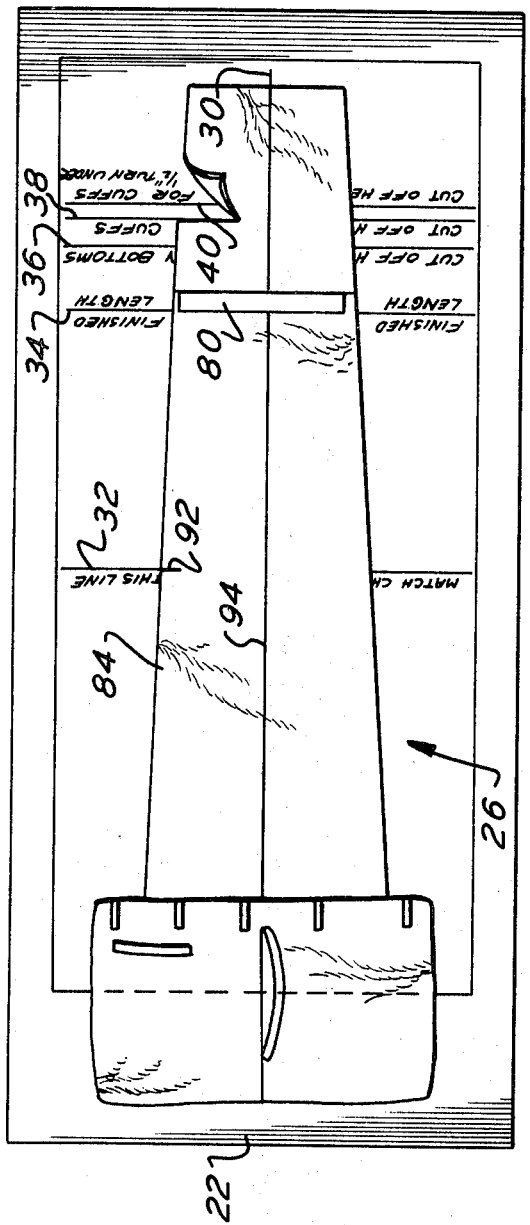
FIG. 7 is a top plan view of a pair of trousers being placed on the layout table and in the process of being cut in order to finish the legs of the trousers.

Table 20 basically comprises a horizontally disposed planar top 22 and four legs 24 for supporting the same. The layout table 20 is similar to conventional layout tables; however, it also includes, on the top surface thereof, a marked layout section 26. Layout section 26 preferably comprises a decalcomania which is adhesively secured to the tabletop. Provided in the layout section, is a longitudinally extending line 30 which includes a legend "side seam to match this line" adjacent thereto and at each end thereof. A plurality of spaced lines 32, 34, 36, 38 and 40 are provided which extend transversely to longitudinally extending line 30. Line 32 is provided centrally of the longitudinal line 30 and bears the legends "match chalk mark on calf to this line" adjacent thereto above the line. Line 34 is spaced from the line 32 and includes the legend "finished length" adjacent thereto and at each end thereof. Line 36 is spaced from line 34 on the side opposite that of line 32 and provided adjacent thereto is the legend "cut off here for plain bottoms." Line 38 is spaced from line 36 on the opposite side of line 34 and includes the legend "cut off here for cuffs" adjacent thereto. Similarly, line 40 is spaced from line 38 on the opposite sides of lines 32, 34 and 36 and includes the legend "cut off here ½" turn under" adjacent thereto and below the line.

The elongated marking member 42 embodying the invention is best shown in FIG. 2 and is generally Y-shaped and includes a pair of legs 44, and a stem 46 having an enlarged top portion 48. The measuring stick 42 has a substantially planar front face 50 and a rear face 52 having a Y-shaped recess 54. Integrally secured within the recess 54 are a plurality of ribs 56 which provides structural rigidity to the measuring stick. The stick is preferably comprised of a thermoplastic resin and is considerably lightened by provision of recess 54.

Provided in the enlarged uppermost section 48 of the stem 46 is a planar tab 58. Tab 58 is mounted within a recessed slot 60 having a trapezoidal cross-section. The outermost opening of recess 60 is therefore smaller than the inner dimensions of the recess. Thus, recess 60 includes a pair of angularly extending sides 62 which, as will hereinafter be seen, act as tracks to guide the movement of tab 58. Tab 58 is also of trapezoidal cross-section and thus fits tightly within the recess 60 and is adapted to slide longitudinally within the recess.

As best seen in FIG. 3, the tab 58 includes on its outer surface, the legends A, B and C adjacent to score lines 64, 66 and 68, respectively. Provided adjacent recess 60 on the front surface of the enlarged portion 48 of the stem, is a score line 70. Provided on the opposite side of recess 62, is a bead 72. The tab 58 also includes three recesses 74, 76 and 78 which are aligned with the score lines 64, 66 and 68, respectively, and are provided on the lateral edge of the front face of the tab.

The bead 72 and recesses 74, 76 and 78 coact with each other to detent the tab 58 when the lines 64, 66 or 68 are aligned with the score line 70. In this manner, the tab is secured at three positions with respect to the top of the marking member 42. When the line 64 labeled A is adjacent score line 70, the member 42 enables the trousers to be measured and marked for the bottom edge of the finished legs of the trousers to be worn spaced above the top of the wearer's shoes. When the line 66 labeled B is positioned adjacent score line 70, the member 42 enables the trousers to be measured and marked for a longer finished length so that there is no break in the trousers when worn but the lowermost edge thereof is adjacent the top of the shoes. The third position, of tab 58 of member 42, when line 68 labeled C is secured adjacent score line 70, enables measurement and marking of the trouser legs for a finished length which is adjacent the top of the shoes of the wearer but causes a slight break in the legs of the trousers.

An opening 79 is provided in the stem 46 adjacent the enlarged top end. The opening 79 enables the marking member to be hung on a hook or wire nail for convenience.

The remaining portion of the apparatus used for measuring and marking the trouser legs embodying the invention is a ruler 80, the width of which is used to determine the width of the cuffs where cuffs are desired. The ruler 80 is substantially planar and elongated and includes a central notch 82 which forms a channel at the centermost portion of the ruler. A plurality of these rulers is preferably provided. Each of the rulers is of a different width in accordance with the different cuff size desired.

Referring to FIG. 5, the elongated marking member 42 can be seen in operation for enabling the marking of the trouser leg 84 when it is being worn. The excess material portion of the trouser leg is folded up as at 86 to enable the trousers to fall straight. The marking member 42 is placed against the rear of the wearer's leg so that the legs 44 of the member 42 are placed about the heel 88 of the wearer's shoe 90. Assuming that it is desired that the lowermost edge of leg 84 of the trousers be spaced above the top edge of the wearer's shoes, the tab 58 is set so that the A line 64 is aligned with score line 70. The top of the tab is then used to place a chalk mark 92 by a tailor's chalk placed against the rear calf of the legs of the trousers and aligned with the top edge of the tab. This step is repeated on the other leg of the trousers. Of course, where the length of the trouser legs are worn differently than in the example given, the tab 58 is adjusted accordingly so that the chalk may be placed against the top edge of the tab 58 for making a chalk mark 92 which determines the longer length.

Referring now to FIG. 7, it can be seen that the legs 84 of the trousers are placed on the top 22 of table 20 so that the inseam 94 is aligned with and placed directly over the longitudinally extending line 30. The chalk mark 92 on each leg of the trousers is placed in alignment with the line 32. Where cuffs are desired, the ruler 80 is placed over the finished length line 34 so that the top edge thereof is aligned with line 34. A chalk line is then drawn above and below ruler 80 so that the cuffs will be folded along these lines for finishing thereof. Prior to folding along the lines, the excess material is cut off along line 38 as shown in FIG. 7.

Figure 8:
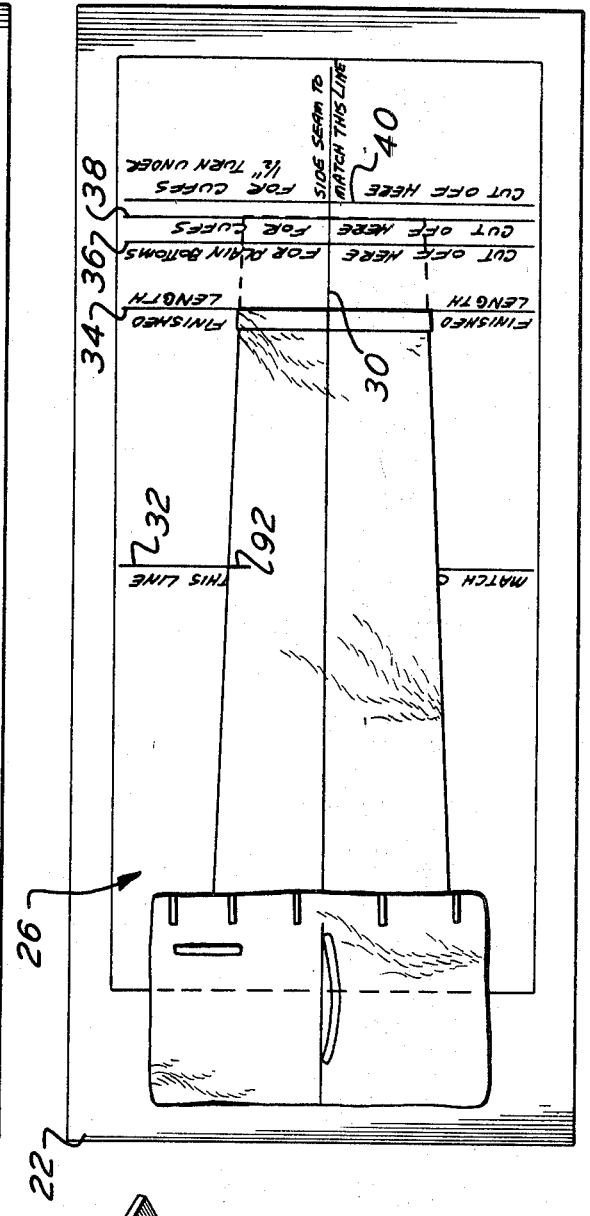
FIG. 8 is a top plan view of the finished trousers on the layout table.
Figure 6:
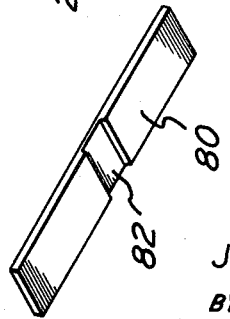
FIG. 6 is a perspective view of a ruler for determining the width of finished cuffs.

As seen in FIG. 8, after the cuffs have been folded over and under in a conventional fashion, the bottoms of the trouser legs 84 are aligned with the finished length line 34. The length of the trouser legs is thus fitted exactly as the wearer desires and each leg matches the leg of the user.

Where plain bottoms are desired, the only change is that ruler 80 would not be used to mark off the bottoms of the cuffs. Instead of cutting the trousers along line 38, the trouser legs would be cut along line 36. The material remaining would then be folded underneath the trousers until the finished length of the trousers match line 34. Where cuffs are desired, but a "½″ turn under" is required by the tailor, rather than using line 38, line 40 is used for cutting off excess material from the trousers.

It should be noted that having once measured and marked the trousers with the marking member 42, it is unnecessary for the tailor to consider either the difference in the legs, the length of the legs of the wearer or the length which the wearer desires. That is, the measuring table is used in the same manner irrespective of the length of the trusers once the trousers have been marked in accordance with the marking member 42. That is, the salesman makes the determination of how the purchaser desires to wear his trousers and then marks the trousers accordingly by use of the tab 58 in positions A, B, or C. The tailor need not know how the user wears the trousers and the process used for finishing the trousers is the same whether length A, B or C is desired. The tailor need only determine whether or not cuffs are desired. If cuffs are desired, the tailor has the option of using either line 38 or line 40 to cut off the excess material of the trousers. If cuffs are not desired, then the tailor merely cuts along line 36 and in all of these cases, uses the finished length line 34, to determine the bottommost edge of the trousers.

It can therefore be seen that a quick inexpensive method of marking and measuring trouser legs has been provided. The marking member 42 is simple to use and does not require undue bending on the part of the salesman. A trained tailor is not required to provide the marks on the legs of the trousers and, in effect, an unskilled salesman can provide as accurate a mark as a skilled tailor.

The skilled tailor can therefore be used more efficiently in that he need not make unnecessary trips to the dressing room in order to mark the trousers of the customers. Where only the length of the trousers has to be finished, the tailor need only look for the two chalk marks 92 on each of the trouser legs and can finish the trousers quickly without the necessity of determining the length of the trousers that the user desires. Moreover, the length of the trousers in front and in back is more uniform as a result of this method in that the marking lines 34 through 40 provided on the marking section 26 of the table 22 enable squarer cutting which causes the bottom edges to be more parallel to the ground.

Without further elaboration, the foregoing will so fully illustrate my invention, that others may, by applying current or future knowledge, readily adapt the same for use under various conditions of service.

I claim:

1. Measuring and marking apparatus for men's trousers comprising an elongated member for enabling marking of each leg of said trousers a predetermined height above the floor and a layout member, said layout member being horizontally disposed and including a longitudinally extending line and a plurality of spaced lines extending transversely to said longitudinal line, a first one of said transverse lines corresponding to the marks on the legs and a second of said transverse lines corresponding to the finished length of said trousers, said trouser legs being finished by resting said trouser legs on said layout member and aligning the inseam of each of said legs over the longitudinal line and aligning said marks on said legs with said first line and finishing the trousers at said second line, said elongated member being generally Y-shaped and including a pair of spaced legs which enable the elongated member to fit over the rear of the heel of the wearer of said trousers to facilitate marking of said trouser legs.

2. The invention of claim 1 wherein said elongated member includes a longitudinally slidable member for changing the overall length of said elongated member so that the style in which the trousers are worn may be determined by the overall length of said elongated member.

3. The invention of claim 2 wherein said slidable member includes indicia and said elongated member includes a score line adjacent said slidable member, said elongated member also including detent means for selectively securing said slidable member in one of a plurality of discrete positions for determining the final length of said trousers.

References Cited

UNITED STATES PATENTS

| | | |
|---|---|---|
| 2,381,191 | 8/1945 | Trumbell. |
| 2,677,889 | 5/1954 | De Pew. |
| 2,711,587 | 6/1955 | Branman. |
| 3,094,782 | 6/1963 | Galindo. |
| 2,665,483 | 1/1954 | Sabatini. |

LEONARD FORMAN, Primary Examiner

D. A. DEARING, Assistant Examiner